United States Patent
Yuan et al.

(10) Patent No.: US 11,783,131 B2
(45) Date of Patent: Oct. 10, 2023

(54) KNOWLEDGE GRAPH FUSION

(71) Applicant: International Business Machines Corporation, Armonk, NY (US)

(72) Inventors: Zhong Fang Yuan, Xian (CN); Chen Gao, Xian (CN); Tong Liu, Xian (CN); De Shuo Kong, Beijing (CN); Ci-Wei Lan, Keelung (TW); Rong Fu He, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 17/017,258

(22) Filed: Sep. 10, 2020

(65) Prior Publication Data

US 2022/0075948 A1 Mar. 10, 2022

(51) Int. Cl.
| | | |
|---|---|---|
| *G06F 40/295* | (2020.01) | |
| *G06F 16/901* | (2019.01) | |
| *G06N 5/02* | (2023.01) | |
| *G06N 20/00* | (2019.01) | |

(52) U.S. Cl.
CPC ........ *G06F 40/295* (2020.01); *G06F 16/9024* (2019.01); *G06N 5/02* (2013.01); *G06N 20/00* (2019.01)

(58) Field of Classification Search
None
See application file for complete search history.

(56) References Cited

U.S. PATENT DOCUMENTS

| | | |
|---|---|---|
| 8,340,955 B2 | 12/2012 | Brown et al. |
| 2017/0103069 A1 | 4/2017 | Brennan et al. |
| 2017/0235885 A1* | 8/2017 | Cox .................. G06F 16/2455 705/2 |
| 2019/0303412 A1 | 10/2019 | Ray et al. |

(Continued)

FOREIGN PATENT DOCUMENTS

| | | | |
|---|---|---|---|
| CN | 110727779 A | 1/2020 | |
| CN | 111401928 A * | 7/2020 | ......... G06F 16/3344 |

(Continued)

OTHER PUBLICATIONS

Multi-source Knowledge Fusion: A Survey; Xiaojuan Zhao; Yan Jia; Aiping Li; Rong Jiang; Haocheng Xie; Yichen Song; Weihong Han; Jun. 23-25, 2019 URL: https://ieeexplore.ieee.org/document/8923525 (Year: 2019).*

(Continued)

*Primary Examiner* — Richa Mishra
(74) *Attorney, Agent, or Firm* — Peter Suchecki

(57) ABSTRACT

Provided is a method, computer program product, and system for fusing knowledge graphs to generate a larger knowledgebase for responding to cross document questions. A processor may extract contextual information from a plurality of documents. The processor may generate, based on the extracted contextual information, a knowledge graph for each document of the plurality of documents. The processor may analyze each knowledge graph to determine if one or more entities of each knowledge graph are linked. The processor may fuse, in response to an entity in a first knowledge graph being linked to an entity in a second knowledge graph, the first knowledge graph with the second knowledge graph to create a fused knowledge graph.

13 Claims, 8 Drawing Sheets

(56) References Cited

U.S. PATENT DOCUMENTS

2020/0004752 A1* 1/2020 Majumdar ............... H04L 41/16
2020/0410012 A1* 12/2020 Moon ..................... G06Q 10/04
2021/0064932 A1* 3/2021 Wang ....................... G06N 5/02

FOREIGN PATENT DOCUMENTS

| CN | 111666422 A * | 9/2020 |
| EP | 3005168 A1 | 4/2016 |
| EP | 3095052 A1 | 11/2016 |
| WO | 2012040674 A2 | 3/2012 |

OTHER PUBLICATIONS

QA4IE: A Question Answering Based System for Document-Level General Information Extraction; Lin Qiu; Dongyu Ru; Quanyu Long; Weinan Zhang; Yong Yu; Jan. 28, 2020; URL: https://ieeexplore.ieee.org/document/8972460 (Year: 2020).*

Cao, et al., "Question Answering by Reasoning Across Documents with Graph Convolutional Networks," https://arxiv.org/pdf/1808.09920.pdf, arXiv:1808.09920v3 [cs.CL], Apr. 7, 2019, 13 pgs.

Clancy et al., "Knowledge Graph Construction from Unstructured Text with Applications to Fact Verification and Beyond," https://www.aclweb.org/anthology/D19-6607.pdf, Proceedings of the Second Workshop on Fact Extraction and VERification (FEVER), pp. 39-46, Hong Kong, Nov. 3, 2019, © 2019 Association for Computational Linguistics.

Joshi et al., "ALDA: Cognitive Assistant for Legal Document Analytics," https://www.aaai.org/ocs/index.php/FSS/FSS16/paper/download/14119/13681, The 2016 AAAI Fall Symposium Series: Cognitive Assistance in Government and Public Sector Applications Technical report FS-16-02, pp. 149-152.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

KNOWLEDGE GRAPH FUSION

BACKGROUND

The present disclosure relates generally to the field of question and answer (Q&A) systems, and more specifically to utilizing knowledge graph fusion for responding to cross-document questions.

In traditional Q&A systems, the answer to a question is usually inferred from multiple sources. To answer the question, these Q&A systems must organize a large amount of corpora and artificially build a corpus. Using the corpus and conventional reading comprehension allows the Q&A systems to answer factual questions. In some instances, one or more knowledge graphs may be used to generate an answer to a question.

SUMMARY

Embodiments of the present disclosure include a method, computer program product, and system for fusing knowledge graphs to generate a larger knowledgebase for responding to cross document questions. A processor may extract contextual information from a plurality of documents. The processor may generate, based on the extracted contextual information, a knowledge graph for each document of the plurality of documents. The processor may analyze each knowledge graph to determine if one or more entities of each knowledge graph are linked. The processor may fuse, in response to an entity in a first knowledge graph being linked to an entity in a second knowledge graph, the first knowledge graph with the second knowledge graph to create a fused knowledge graph.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
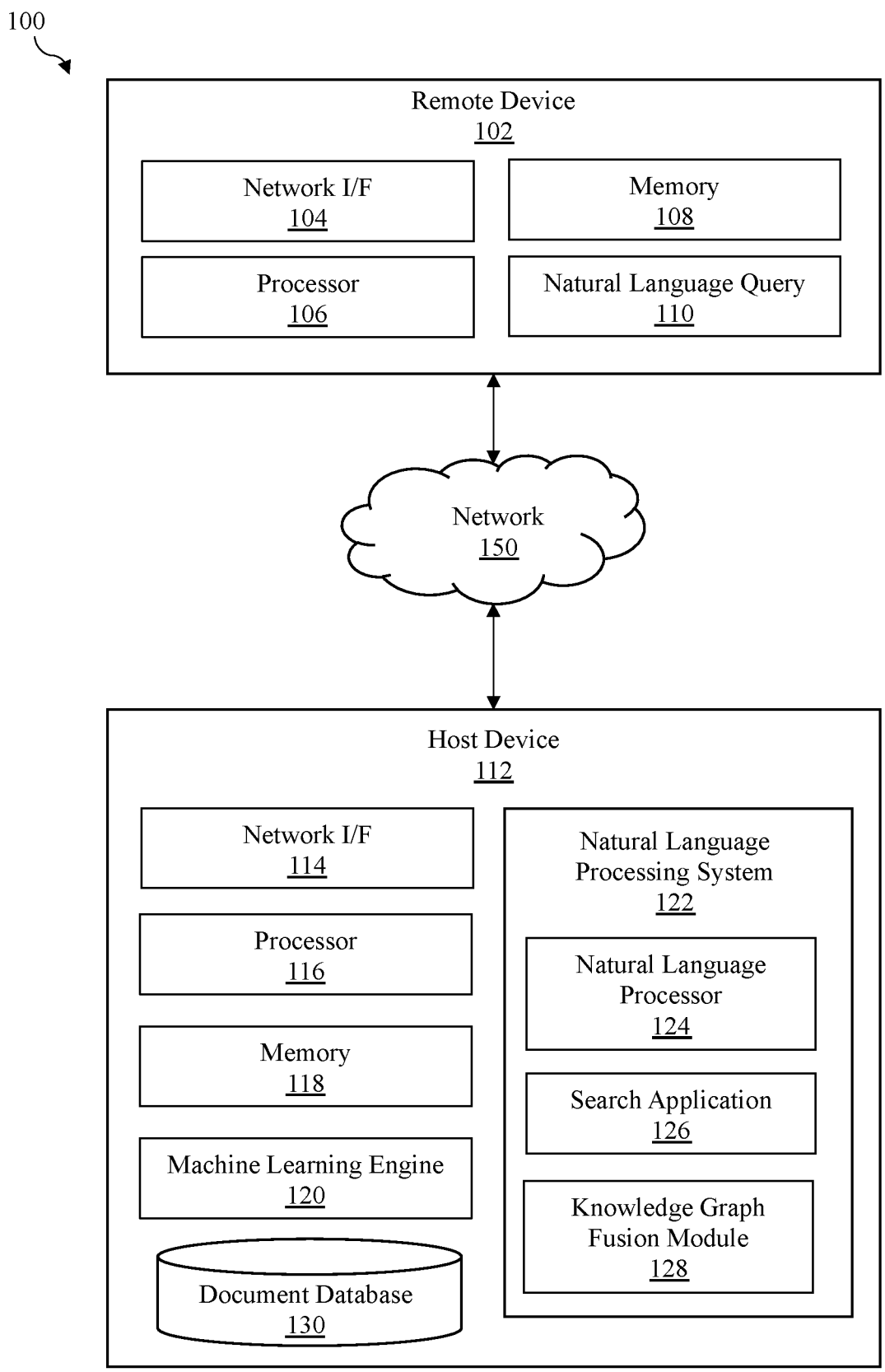
FIG. 1 illustrates a block diagram of an example computing environment in which illustrative embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of Q&A systems, and more particularly to utilizing knowledge graph fusion for responding to cross-document questions. While the present disclosure is not necessarily limited to such applications, various aspects of the disclosure may be appreciated through a discussion of various examples using this context.

In traditional Q&A systems, the answer to a question is usually inferred from multiple sources. To answer the question, these Q&A systems must organize a large amount of corpora, and artificially build a corpus. Using the corpus and conventional reading comprehension allows the Q&A systems to answer factual questions. In some instances, one or more knowledge graphs may be used to generate an answer to a question. However, traditional Q&A systems are not suitable for cross-document answer collation and may fail to obtain accurate answers from multiple documents.

Embodiments of the present disclosure relate to a method, computer program product, and system for utilizing knowledge graph fusion to provide cross-document based reasoning for answering queries presented to a Q&A system.

In embodiments, the system may extract contextual information from a plurality of documents. The plurality of documents may denote a corpus of data or knowledge preferably related to a specific knowledge domain. The documents may be in various forms such as an article, a book, a whitepaper, a newspaper, conference proceedings, a magazine, a chat protocol, a manuscript, handwritten notes, a server log, an email thread, and the like, which are only examples. The plurality of documents may start with only one document and may, e.g., also comprise a complete library, i.e., a public library, a library of a research institute or an enterprise library comprising all handbooks of the company. On the other hand, it may be as small as a chat protocol between two programmers regarding a specific problem.

The system may use natural language processing (NLP) to extract the contextual information to determine one or more entities (e.g., a person, a business, an object, location, monetary value, topic, and the like) from each respective document. In embodiments, the system may use name-entity recognition (NER) and machine reading comprehension to perform the extraction of contextual information from the documents related to the one or more entities. For example, the system may perform NER on unstructured text of each document to identify the one or more entities by analyzing mentions of the respective entities in the unstructured text.

Once idenified, the system may analyze the one or more entities using a reading comprehension dataset (e.g., Stanford Question Answering Dataset (SQuAD), SQuAD2, etc.) to identify further sub-entities and/or relationships between the one or more entities.

In embodiments, once the entities and relationships are identified, the system may generate a knowledge graph for each document based on the extracted contextual information. The term "knowledge graph" may denote a data structure comprising vertices and edges linking selected ones of the vertices. A vertex may represent a fact, term, phrase or word, and an edge between two vertices may express that a relationship may exist between the linked vertices. The edge may also carry a weight, i.e., a weight value may be assigned to each of the plurality of edges. A knowledge graph may comprise thousands or millions of vertices and even more edges. Knowledge graphs may grow by adding new terms (i.e., vertices) and linking them via new edges to existing vertices. A knowledge graph may also be organized as a plurality of edges with two vertices each. In embodiments, the vertex may also be referred to as a node. The node may designate the respective entity, and the edges connecting the node may express a relationship between that node and one or more other nodes.

In embodiments, once each knowledge graph is generated for each respective document, the system may analyze each knowledge graph to determine if one or more entities of the respective knowledge graphs are linked. In other words, the system determines whether entities (e.g., nodes) in different knowledge graphs are linked to each other (e.g., across multiple knowledge graphs). This may be performed by an entity alignment model and/or an entity linking model. The system may use a similarity score for each entity to determine if the entities of respective knowledge graphs are linked. If the entities are determined to be linked, the system will fuse a first knowledge graph with a second knowledge graph to create a fused knowledge graph. It is contemplated that two or more knowledge graphs may be fused together, such that the fused knowledge graph represents a larger knowledgebase than the first knowledge graph and the second knowledge graph on an individual level.

In embodiments, the respective steps of generating and fusing knowledge graphs having related and/or linked entities may be performed automatically by using machine learning. The term "machine-learning"—and based on that the term "machine-learning model"—may denote known methods of enabling a computer system to improve its capabilities automatically through experience and/or repetition without procedural programming. Thereby, machine-Learning (ML) can be seen as a subset of artificial intelligence. Machine-learning algorithms build a mathematical model—i.e., the machine-learning model—based on sample data, known as "training data", in order to make predictions or decisions without being explicitly programmed to do so. One implementation option may be to use a neutral network comprising nodes for storing fact values and/or a transformation function to transform incoming signal. Furthermore, selected ones of the nodes may be linked to each other by edges (connections), potentially having a weight factor (expressing a strength of the link which may be interpreted as an input signal for one of the cores). Beside neural networks (NN) with only 3 layers of cores (input layer, hidden layer, output layer), also NN with a plurality of hidden layers of various forms exist.

Once the fused knowledge graph is generated from two or more individual knowledge graphs, the system may respond to a natural language query (NLQ) regarding the one or more entities associated with the fused knowledge graph. The NLQ may denote, in general, a question posed by a person or user in the form of human understandable text in natural language. The NLQ may have to be transformed to a machine-interpretable query. SQL (structured query language) may be one option for a form of machine-interpretable query.

Once the NLQ is received, the system may analyze the fused knowledge graph to determine an answer to the NLQ. In embodiments, the system may perform a random walk along the nodes and edges of the fused knowledge graph to determine the answer to the NLQ. Random walk may denote a process of starting at one vertex of a knowledge graph and traversing to another vertex via an edge. Typically, a vertex may have a couple of edges linking the vertex to a plurality of other vertices. Randomness may result from random selections of edges traversed. The random walk may end if the process arrives at a leaf of the knowledge graph, i.e., a vertex having only the incoming edge. As a result, a plurality of sequences of vertices and edges may be generated. A vertex linked by an edge to another vertex may be seen as relatively close (e.g., content-wise) to the other vertex, and vice versa. In case of a tree-like fused knowledge graph each new random walk may start again and again at the root but take different routes through the branches until a leaf is reached. A random walk may also end after a predefined number of vertices and edges have been touched. As a simple example there may be the two vertices "monkey" and "banana." These two vertices may be linked by the edge "gets eaten by" or "is liked by". From this, two possible sequences may be generated: (i) "banana is liked by monkey," and (ii) "banana get eaten by monkey." Although the vertices are present in both sequences, the sequences would count as different due to the different edges.

The fused knowledge graph presents the system with a significantly larger knowledgebase to determine and/or identify answers to questions across multiple documents. In this way, the fused knowledge graph allows more vertices and nodes to be traversed in order to more accurately answer an NLQ. Once the system arrives at the answer using the fused knowledge graph, the system may output or provide the answer to the NLQ to a user.

The aforementioned advantages are example advantages, and not all advantages are discussed. Furthermore, embodiments of the present disclosure can exist that contain all, some, or none of the aforementioned advantages while remaining within the spirit and scope of the present disclosure.

As discussed above, aspects of the disclosure may relate to natural language processing. Accordingly, an understanding of the embodiments of the present disclosure may be aided by describing embodiments of natural language processing systems and the environments in which these systems may operate. Turning now to the figures, FIG. 1 illustrates a block diagram of an example computing environment 100 in which illustrative embodiments of the present disclosure may be implemented. In some embodiments, the computing environment 100 may include a remote device 102 and a host device 112.

Consistent with various embodiments, the remote device 102 and the host device 112 may be computer systems. The remote device 102 and the host device 112 may include one or more processors 106 and 116 and one or more memories 108 and 118, respectively. The remote device 102 and the host device 112 may be configured to communicate with each other through an internal or external network interface 104 and 114. The network interfaces 104 and 114 may be, e.g., modems or network interface cards. The remote device 102 and/or the host device 112 may be equipped with a display or monitor. Additionally, the remote device 102 and/or the host device 112 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). The host device 112 may, in various embodiments, be connected to an output device. For example, the output device may be a tablet, an e-reader, or a printer. In some embodiments, the remote device 102 and/or the host device 112 may be servers, desktops, laptops, or hand-held devices.

The remote device 102 and the host device 112 may be distant from each other and communicate over a network 150. In some embodiments, the host device 112 may be a central hub from which remote device 102 can establish a communication connection, such as in a client-server networking model. Alternatively, the host device 112 and remote device 102 may be configured in any other suitable networking relationship (e.g., in a peer-to-peer configuration or using any other network topology).

In some embodiments, the network 150 can be implemented using any number of any suitable communications media. For example, the network 150 may be a wide area network (WAN), a local area network (LAN), an interne, or an intranet. In certain embodiments, the remote device 102 and the host device 112 may be local to each other, and communicate via any appropriate local communication medium. For example, the remote device 102 and the host device 112 may communicate using a local area network (LAN), one or more hardwire connections, a wireless link or router, or an intranet. In some embodiments, the remote device 102 and the host device 112 may be communicatively coupled using a combination of one or more networks and/or one or more local connections. For example, the first remote device 102 may be hardwired to the host device 112 (e.g., connected with an Ethernet cable) while a second remote device (not shown) may communicate with the host device using the network 150 (e.g., over the Internet).

In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150. In embodiments, network 150 may be substantially similar cloud computing environment 50 illustrated in FIG. 7.

In embodiments, the remote device 102 may enable users to submit (or may submit automatically with or without user input) a natural language query (NLQ) 110 to the host device 112 to obtain an answer to the query. The NLQ 110 may be in the form of unstructured text entered in a user interface (UI), and the UI may be any type of interface (e.g., command line prompts, menu screens, graphical user interfaces). The UI may allow a user to interact with the remote device 102 to submit the NLQ 110 to the host device 112.

In some embodiments, the host device 112 may include a natural language processing system 122. The natural language processing system 122 may include a natural language processor 124, a search application 126, and a knowledge graph fusion module 128. The natural language processor 124 may include numerous subcomponents, such as a tokenizer, a part-of-speech (POS) tagger, a semantic relationship identifier, and a syntactic relationship identifier. An example natural language processor is discussed in more detail in reference to FIG. 2.

The search application 126 may be implemented using a conventional or other search engine, and may be distributed across multiple computer systems. The search application 126 may be configured to search one or more databases or other computer systems for content (e.g., an electronic document) that is related to the NLQ 110 submitted by a remote device 102. For example, the search application 126 may be configured to search a document database 130 related to the submitted NLQ 110 to identify relationships between a target entity, various edges, and/or other entities. In embodiments, a plurality of knowledge graphs may be generated (e.g., by knowledge graph generator 232 of FIG. 2) for specific entities identified by the search application 128 from a plurality of documents. Using the generated knowledge graphs, the knowledge graph fusion module 128 may determine further links and/or relationships between the identified entities to generate a fused knowledge graph. The fused knowledge graph represents a larger knowledge base that is configured to be used to answer NLQ using cross document reasoning. The fused knowledge graph may be stored in a memory (e.g., memory 118, document database 13) for use in answering the NLQ 110 and/or future queries.

In some embodiments, the host device 112 may automatically/continually search, collect, and analyze documents (e.g., new documents added to the document database 130, unanalyzed documents, etc.) to increase the breadth of the fused knowledge graph and/or individual knowledge graphs. For example, the host device 112 will continually parse new documents to determine further entities, entity relationships between one or more entities, attributes, and/or characteristics.

In embodiments, the host device 112 may use a machine learning engine 120 to improve its capabilities automatically through experience and/or repetition without procedural programming. For example, machine learning engine 120 may analyze the accuracy of answers to NLQs provided by the host device to the user. The machine learning engine 120 may determine if the answer was correct by monitoring further NLQs submitted by the user related to the same or similar question. The machine learning engine 120 may determine that the answer was incorrect and/or not accurate based on further similar follow up questions based on the entity. The machine learning engine 120 may modify algorithms for traversing the fused knowledge graph in order to provide more accurate answers. In this way, the system may become more accurate in providing correct answers initially without the user having to submit follow-up NLQs.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBDT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

While FIG. 1 illustrates a computing environment 100 with a single host device 112 and a single remote device 102, suitable computing environments for implementing embodiments of this disclosure may include any number of remote devices and host devices. The various modules, systems, and components illustrated in FIG. 1 may exist, if at all, across a plurality of host devices and remote devices.

It is noted that FIG. 1 is intended to depict the representative major components of an exemplary computing environment 100. In some embodiments, however, individual components may have greater or lesser complexity than as represented in FIG. 1, components other than or in addition to those shown in FIG. 1 may be present, and the number, type, and configuration of such components may vary.

Figure 2:
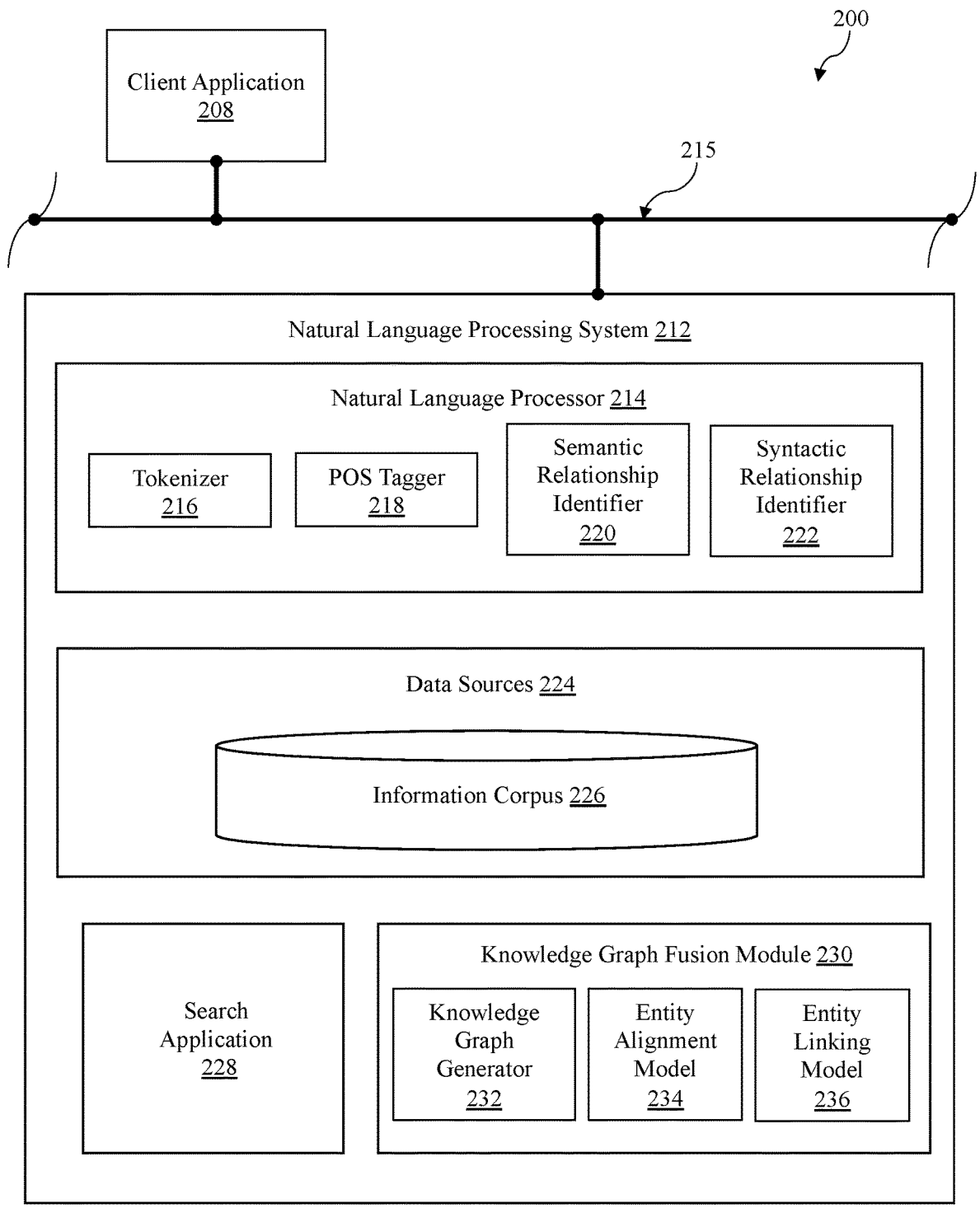
FIG. 2 illustrates a block diagram of an example natural language processing system configured to ingest electronic documents and generate one or more knowledge graphs, in accordance with embodiments of the present disclosure.

Referring now to FIG. 2, shown is a block diagram of an exemplary system architecture 200, including a natural language processing system 212, configured to ingest electronic documents and generate one or more knowledge graphs, in accordance with embodiments of the present disclosure. In some embodiments, a remote device (such as remote device 102 of FIG. 1) may submit a natural language query (NLQ) 110 to be analyzed by the natural language processing system 212 which may be housed on a host device (such as host device 112 of FIG. 1). Such a remote device may include a client application 208, which may be used to send the NLQ 110 via network 215.

Consistent with various embodiments, the natural language processing system 212 may respond to NLQ 110 sent by the client application 208. Specifically, the natural language processing system 212 may analyze the NLQ 110 to extract contextual information to identify a target entity from the query. In some embodiments, the natural language processing system 212 may include a natural language processor 214, data sources 224, a search application 228, and a knowledge graph fusion module 230. The natural language processor 214 may be a computer module that analyzes the received NLQ 110 and a plurality of electronic documents (e.g., documents located on document database 130) relative to one or more entities. The natural language processor 214 may perform various methods and techniques for analyzing the electronic documents (e.g., syntactic analysis, semantic analysis, etc.). The natural language processor 214 may be configured to recognize and analyze any number of natural languages. In some embodiments, the natural language processor 214 may parse passages of the documents. Further, the natural language processor 214 may include various modules to perform analyses of electronic documents. These modules may include, but are not limited to, a tokenizer 216, a part-of-speech (POS) tagger 218, a semantic relationship identifier 220, and a syntactic relationship identifier 222.

In some embodiments, the tokenizer 216 may be a computer module that performs lexical analysis. The tokenizer 216 may convert a sequence of characters into a sequence of tokens. A token may be a string of characters included in an electronic document and categorized as a meaningful symbol. Further, in some embodiments, the tokenizer 216 may identify word boundaries in an electronic document and break any text passages within the document into their component text elements, such as words, multiword tokens, numbers, and punctuation marks. In some embodiments, the tokenizer 216 may receive a string of characters, identify the lexemes in the string, and categorize them into tokens.

Consistent with various embodiments, the POS tagger 218 may be a computer module that marks up a word in passages to correspond to a particular part of speech. The POS tagger 218 may read a passage or other text in natural language and assign a part of speech to each word or other token. The POS tagger 218 may determine the part of speech to which a word (or other text element) corresponds based on the definition of the word and the context of the word. The context of a word may be based on its relationship with adjacent and related words in a phrase, sentence, or paragraph. In some embodiments, the context of a word may be dependent on one or more previously analyzed electronic documents (e.g., the content of one article on an entity may shed light on the meaning of text elements in another article on the same entity, particularly if they are part of the same corpus or universe). Examples of parts of speech that may be assigned to words include, but are not limited to, nouns, verbs, adjectives, adverbs, and the like. Examples of other part of speech categories that POS tagger 218 may assign include, but are not limited to, comparative or superlative adverbs, wh-adverbs, conjunctions, determiners, negative particles, possessive markers, prepositions, wh-pronouns, and the like. In some embodiments, the POS tagger 218 may tag or otherwise annotate tokens of a passage with part of speech categories. In some embodiments, the POS tagger 218 may tag tokens or words of a passage to be parsed by the natural language processing system 212.

In some embodiments, the semantic relationship identifier 220 may be a computer module that may be configured to identify semantic relationships of recognized text elements (e.g., words, phrases) in documents. In some embodiments, the semantic relationship identifier 220 may determine functional dependencies between entities and other semantic relationships.

Consistent with various embodiments, the syntactic relationship identifier 222 may be a computer module that may be configured to identify syntactic relationships in a passage composed of tokens. The syntactic relationship identifier 222 may determine the grammatical structure of sentences such as, for example, which groups of words are associated as phrases and which word is the subject or object of a verb. The syntactic relationship identifier 222 may conform to formal grammar.

In some embodiments, the natural language processor 214 may be a computer module that may parse an electronic document and generate corresponding data structures for one or more portions of the document. For example, in response to receiving an NLQ at the natural language processing system 212, the natural language processor 214 may output parsed text elements from an analyzed electronic document that contains an answer to the NLQ. The answer may be determined by using one or more knowledge graphs generated by the knowledge graph fusion module 230. In some embodiments, a parsed text element may be represented in the form of a parse tree or other graph structure. To generate the parsed text element, the natural language processor 214 may trigger computer modules 216-222.

In some embodiments, the output of the natural language processor 214 may be stored as an information corpus 226 in one or more data sources 224. In some embodiments, data sources 224 may include data warehouses, information corpora, data models, and document repositories. The information corpus 226 may enable data storage and retrieval. In some embodiments, the information corpus 226 may be a storage mechanism that houses a standardized, consistent, clean, and integrated copy of the ingested and parsed electronic documents used to generate one or more knowledge graphs. The information corpus 226 may also include a list of concepts found in the ingested electronic documents used to respond to the NLQ. The data may be sourced from various operational systems. Data stored in the information corpus 226 may be structured in a way to specifically address analytic requirements. In some embodiments, the information corpus 226 may be a relational database.

In some embodiments, the natural language processing system 212 may include a knowledge graph fusion module 230. The knowledge graph fusion module 230 may be a computer module that is configured to generate a fused knowledge graph from two or more knowledge graphs. In some embodiments, the knowledge graph fusion module 230 may contain submodules. For example, the knowledge graph fusion module 230 may contain a knowledge graph generator 232, an entity linking model 234, and an entity alignment model 236. The knowledge graph generator 232 may be configured to parse an electronic document using the natural language processor 214 and related subcomponents 216-222. The knowledge graph generator 232 may then generate, from the parsed electronic document, a knowledge graph consisting of a plurality of nodes (each relating to a different entity and/or concept) and relationship edges. In some embodiments, the knowledge graph generator 232 may use a search application 228 to search a set of (i.e., one or more) corpora (e.g., data sources 224) to identify the concepts and relationships between the entities to generate a knowledge graph for each electronic document.

The entity alignment model 234 may be configured to identify entities in two or more knowledge graphs that were generated for respective documents that refer to the same real-world object. For example, the entity alignment model may identify that the entity "John Doe" from a first knowledge graph may also be the same entity as "Mr. Doe" from a second knowledge graph based on various edges, relationships, attributes, and or characteristics. The entity linking model 236 may be configured to link entity mentions in text from the electronic document with corresponding entities of each knowledge graph generated for the respective document.

The knowledge graph fusion module 230 may use both the entity alignment model 234 and the entity linking model 236 to determine which knowledge graphs generated by the knowledge graph generator 232 are linked, such that they have similar entities and/or relationships. The knowledge graph fusion module 230 may fuse two or more knowledge graphs that have been determined to share linked entities to create a larger fused knowledge graph. The knowledge graph fusion module 230 may use a similarity score to determine which knowledge graphs have linked entities. The similarity score may be compared to a threshold, and if the threshold is met or exceeded, the knowledge graph fusion module will fuse the respective entities and/or knowledge graphs. The resulting fused knowledge graph allows the system to respond to NLQs that were submitted by a user with a more accurate answer by determining the answer using cross-document reasoning.

Figure 3:
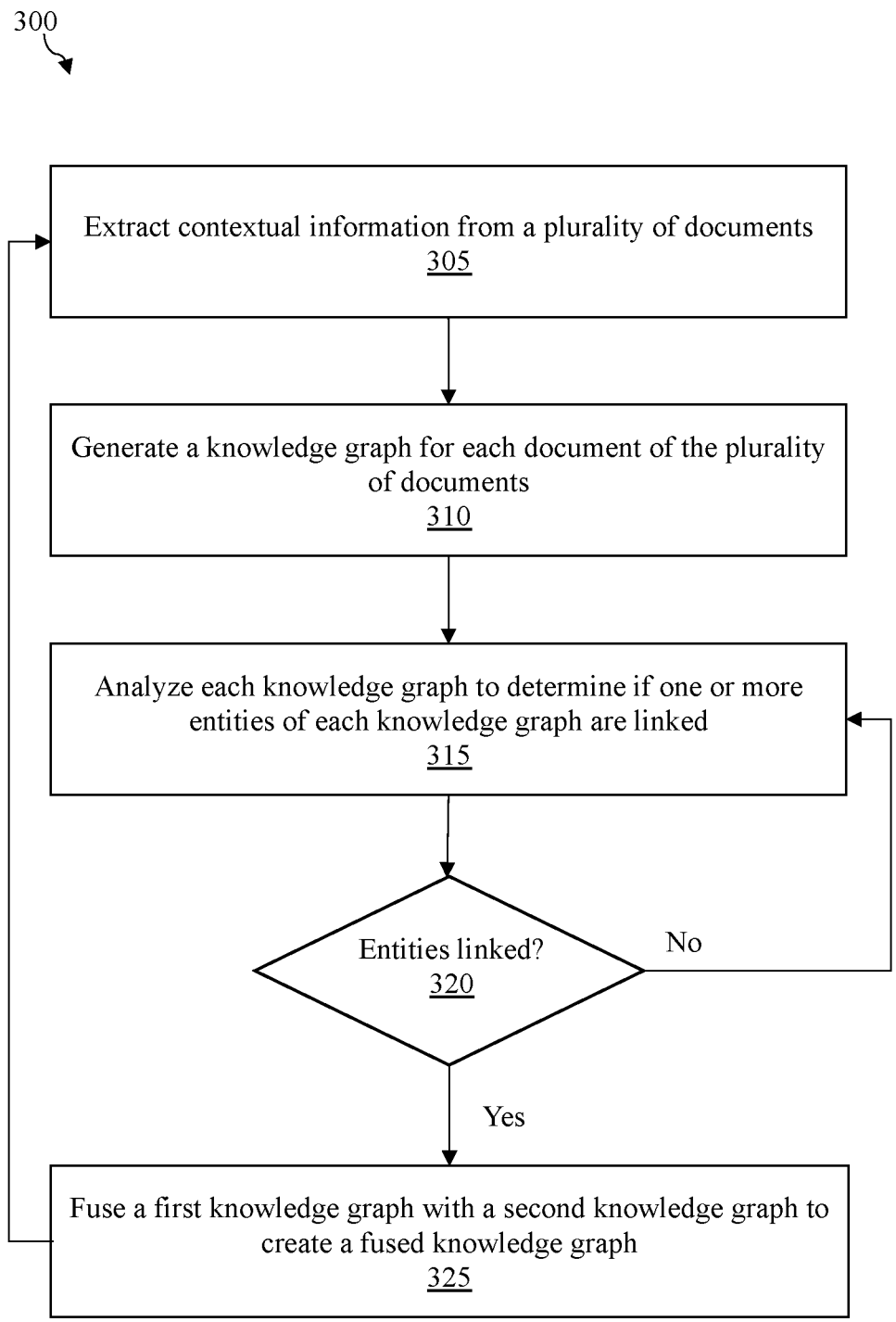
FIG. 3 illustrates a flow diagram of an example process for fusing knowledge graphs, in accordance with embodiments of the present disclosure.
Figure 4A:
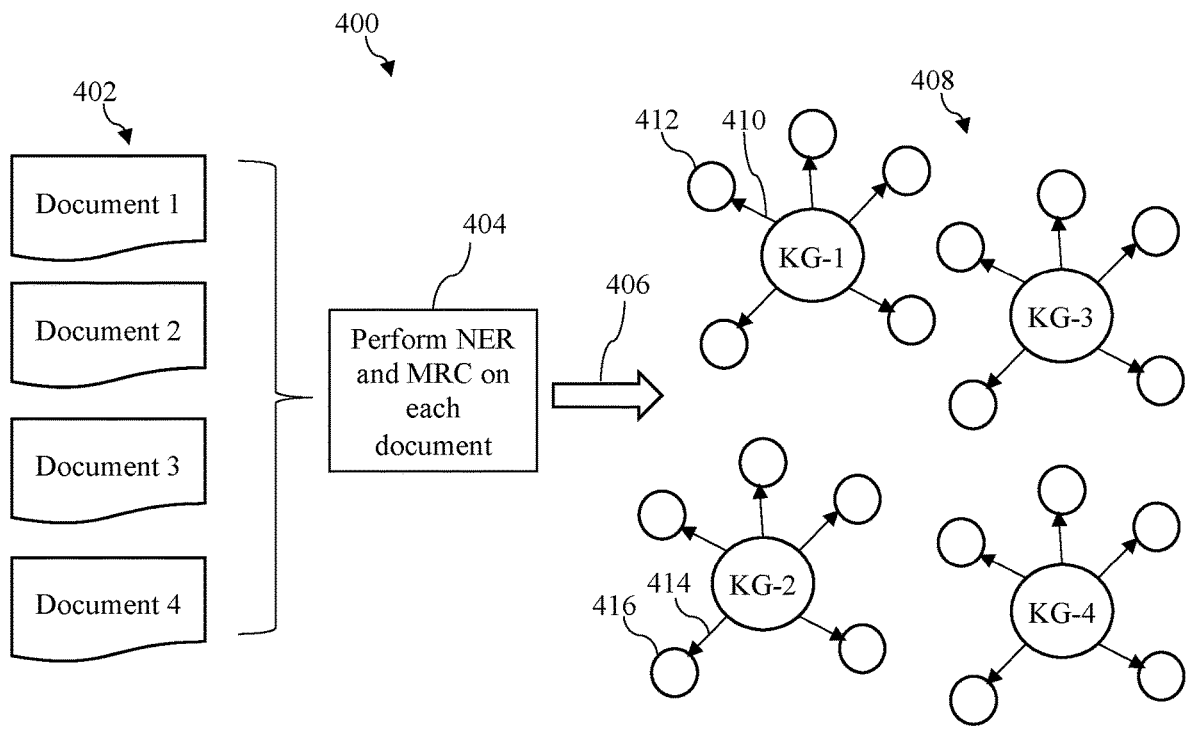
FIG. 4A illustrates an example schematic for generating knowledge graphs from a plurality of documents, in accordance with embodiments of the present disclosure.

Referring now to FIG. 3, shown is a flow diagram of an example process 300 for fusing knowledge graphs, in accordance with embodiments of the present disclosure. The process 300 may be performed by processing logic that comprises hardware (e.g., circuitry, dedicated logic, programmable logic, microcode, etc.), software (e.g., instructions run on a processor), firmware, or a combination thereof. In some embodiments, the process 300 is a computer-implemented process. The process 300 may be performed by processor 116 and/or natural language processor 214 exemplified in FIG. 1 and FIG. 2, respectively. The process 300 will be described with further reference to FIG. 4A and FIG. 4B which illustrate an example schematic 400 for generating a plurality of knowledge graphs from a plurality of documents and an example fused knowledge graph, respectively, in accordance with embodiments of the present disclosure.

The process 300 begins by extracting contextual information from a plurality of documents. This is illustrated at step 305. For example, turning to FIG. 4A, host device 112 may analyze a plurality of documents 402 to identify mentions in text that relate to one or more entities (e.g., a person, a business, an object, location, value, topic, etc.). In embodiments, the host device 112 may use name-entity recognition (NER) and machine reading comprehension 404 to identify the one or more entities. For example, the host device 112 may perform NER on unstructured text of each document of the plurality of documents to identify one or more entities. Once identified, the host device 112 may analyze the one or more entities using a reading comprehension dataset. In embodiments, the host device 112 may utilize a Stanford Question Answering Dataset (SQuAD) (e.g., SQuAD2) to analyze the entities to identify further entities and/or relationships between the entities.

For example, the host device 112 may analyze text of a first document that states "Insurance Product A is a health insurance product suitable for people aged between 18-60. Each insurance term is one year, and the target market is the United States." The host device 112 may perform NER and SQuAD to determine that the entity "Insurance Product A" is connected to entities "health insurance", "age 18-60", "United States" and "one year" by relationship edges for "type", "suitable customers", "target market", and "insurance term", respectively. While the host device 112 may analyze a second document stating "Health Insurance Company X is a supplier of various insurance sub-products such as Insurance Product A, Insurance Product B, and Insurance Product C. Further, Health Insurance Company X provides various insurance to a series of users from Demographic A and Demographic B." The host device 112 may determine that entity "Health Insurance Company X" is connected by relationship edges for "sub-product" to entities "Insurance Product A" "Insurance Product B", and "Insurance Product C" and connected to entities "Demographic A" and "Demographic B" by relationship edges "sub-series"

Returning to FIG. 3, once the entities (or nodes) and edges are determined, the process 300 continues by generating, based on the extracted contextual information, a knowledge graph for each document of the plurality of documents. This is illustrated at step 310. Returning to FIG. 4A, using the extracted contextual information (e.g., the identified one or more entities and relationships) from the plurality of documents 402, the host device 112 may generate 406 a knowledge graph 408 for each of the respective documents 402.

For example, a first knowledge graph (KG-1) may be generated for "Insurance Product A" which contains relationship edges 410 for type, suitable customers, target market, and term limit that connect entities/nodes 412 for health insurance product, age range 16-60, United States, and 1 year, respectively. While a second knowledge graph (KG-2) may be generated for Health Insurance Company X containing relationship edges 414 for sub-product and sub-series that connect entities/nodes 416 for Insurance Product A, Insurance Product B, Insurance Product C, Demographic A, and Demographic B. In embodiments, it contemplated the additional knowledge graphs (e.g., KG-3 and KG-4) may be generated for each additional document (e.g., document 3 and 4) that may relate to the same or similar entities.

Returning to FIG. 3, the process 300 continues by analyzing each knowledge graph to determine if one or more entities of each knowledge graph are linked. This is illustrated at step 315. Returning back to FIG. 4A, the host device 112 identifies the entities from each knowledge graph 408 and determines a set of textual mentions related to each of the one or more entities from the plurality of documents. Using the textual mentions, the host device may determine the context associated with each entity from each respective knowledge graph and determine if the relationship between entities from the knowledge graphs are related. If related, the host device 112 may map one or more textual mentions and/or entities from the set of textual mentions to a same or a similar entity. In embodiments, mapping the textual mentions may be based on a similarity score.

For example, the similarity score may be calculated for each particular entity of the set of entities. Each particular entity's similarity score may be calculated by comparing that particular entity's relationships to the first entity's relationships. Each similarity score may then be compared to a threshold. If the similarity score meets or exceeds the threshold, the host device may determine that the entities may be the same or similar and therefore can be fused.

In some embodiments, the similarity score may be weighted based on one or more entity characteristics. For example, the similarity scores may include weights based on where the source of the document came from. For example, a document from a peer reviewed article regarding various entities may be weighted higher than a document coming from a single author regarding a specific entity. In another example, the similarity score for recent documents on a certain subject or entity may have a higher weighted score than an older version of a document.

Returning to FIG. 3, if the entities are determined not to be linked ("No" at step 320), the process 300 returns to step 315 where the processor continues to analyze each knowledge graph to determine further entity relationships. For example, the host device may analyze textual mentions, the named entity, and or edges regarding the entity Insurance Product A from KG-1 and another entity from a separate knowledge graph (not shown) regarding Automobile Insurance and determine they are not linked because the textual mentions do not meet a certain similarity scoring threshold because the insurance products are for different types of coverages (e.g., health insurance vs. automobile insurance).

If the entities between knowledge graphs are determined to be linked ("Yes" at step 320), the process 300 continues by fusing, in response to the one or more entities of each of the knowledge graph being linked, a first knowledge graph with a second knowledge graph to create a fused knowledge graph. This is illustrated at step 325. For example, the entity Insurance Product A from KG-1 and Health Insurance Company X of KG-2 may be determined to be linked because they share common text mentions and/or connected entities since Insurance Product A is a sub-product of Health Insurance Company X.

Figure 4B:
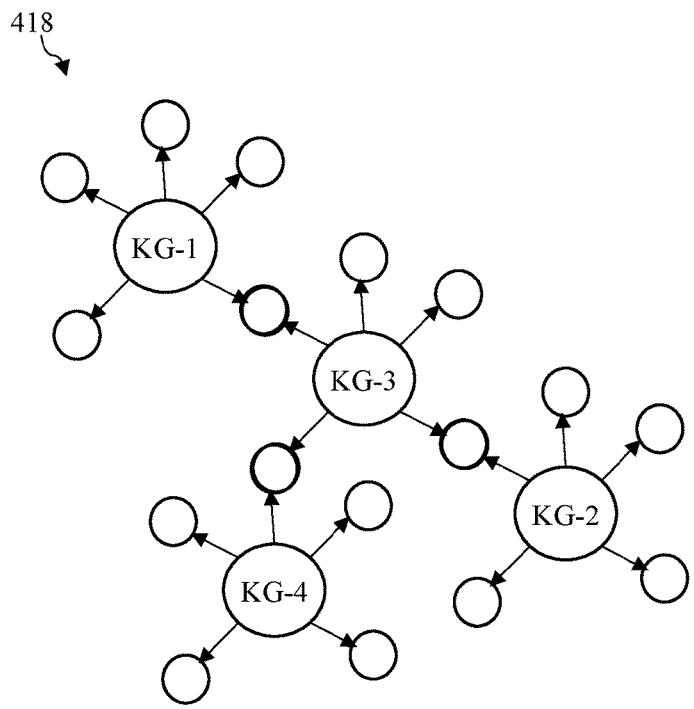
FIG. 4B illustrates an example fused knowledge graph, in accordance with embodiments of the present disclosure.

In embodiments, the fused knowledge graph represents a larger knowledgebase than the first knowledge graph and the second knowledge graph. For example, as shown in FIG. 4B, a fused knowledge graph 418 may be generated by fusing together the multiple knowledge graphs 408 of FIG. 4A where the entities have been determined to be linked. Specifically, the entity Insurance Product A of KG-1 is an entity that was identified as a sub product of entity Health Insurance Company X of KG-2. Therefore, these knowledge graphs may be fused to create a larger knowledge base for answer NLQs regarding health insurance.

Figure 5A:
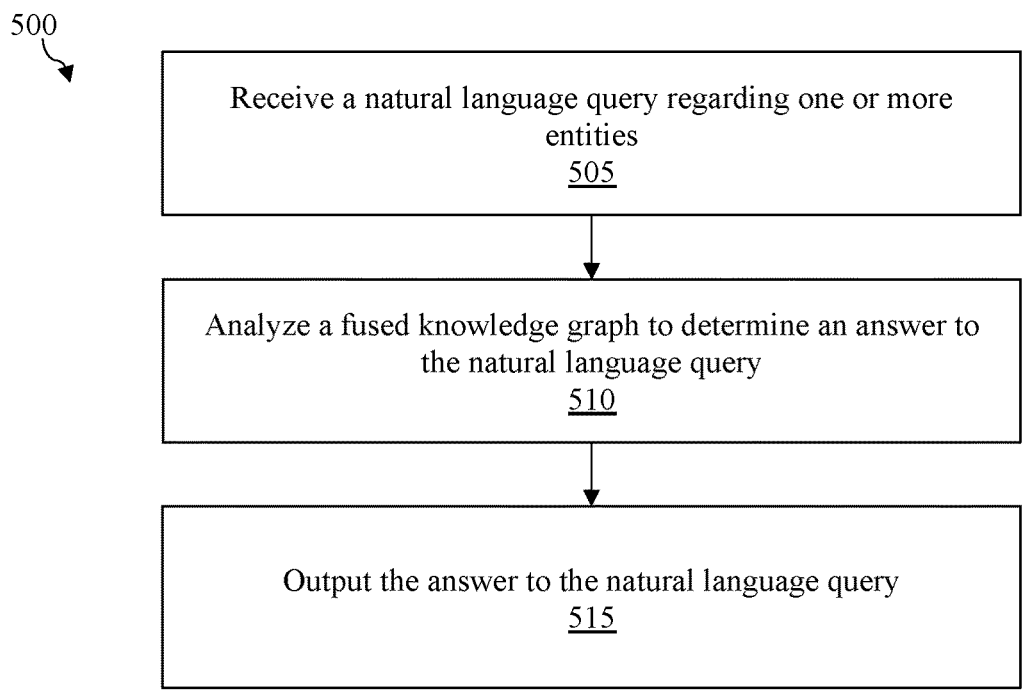
FIG. 5A illustrates a flow diagram for answering a natural language query using a fused knowledge graph, in accordance with embodiments of the present disclosure.

Referring now to FIG. 5A, shown is a flow diagram of an example process 500 for answering a natural language query using a fused knowledge graph, in accordance with embodiments of the present disclosure. The process 500 may be performed by processing logic that comprises hardware (e.g., circuitry, dedicated logic, programmable logic, microcode, etc.), software (e.g., instructions run on a processor), firmware, or a combination thereof. In embodiments, process 500 may be, in addition to, or a subset of process 300. In embodiments, the process 500 is a computer-implemented process. The process 500 may be performed by processor 116 and/or natural language processor 214 exemplified in FIG. 1 and FIG. 2, respectively.

The process 500 begins by receiving a natural language query (NLQ) regarding one or more entities. This is illustrated at step 505. The NLQ may be received from a remote device, such as remote device 102 described in FIG. 1. For example, the NLQ may ask "What type of insurance is best for covering medical conditions related to the heart?" The NLQ can be parsed by a natural language processing system (e.g., natural language processing system 122 or 212 of FIG. 1 and FIG. 2, respectively) to prepare the NLQ—in particular, in the form of a human generated question—to be interpretable as input by the knowledge graph fusion module 230.

The process 500 continues by analyzing a fused knowledge graph to determine an answer to the natural language query. This is illustrated at step 510. Once received, the host device may analyze the fused knowledge graph generated from process 300 to determine an answer to the question. The outputted fused knowledge graph generated by the knowledge graph fusion module is a sequence of edges and related or linked vertices (or nodes) which may be difficult to interpret by a human being. Therefore, these sequences of edges and vertices from the fused knowledge graph may be fed to the natural language processing system—potentially also based on a trained machine-learning model (e.g., machine learning engine 120)—in order to transform the sequence of edges and vertices into a human interpretable answer.

Figure 5B:
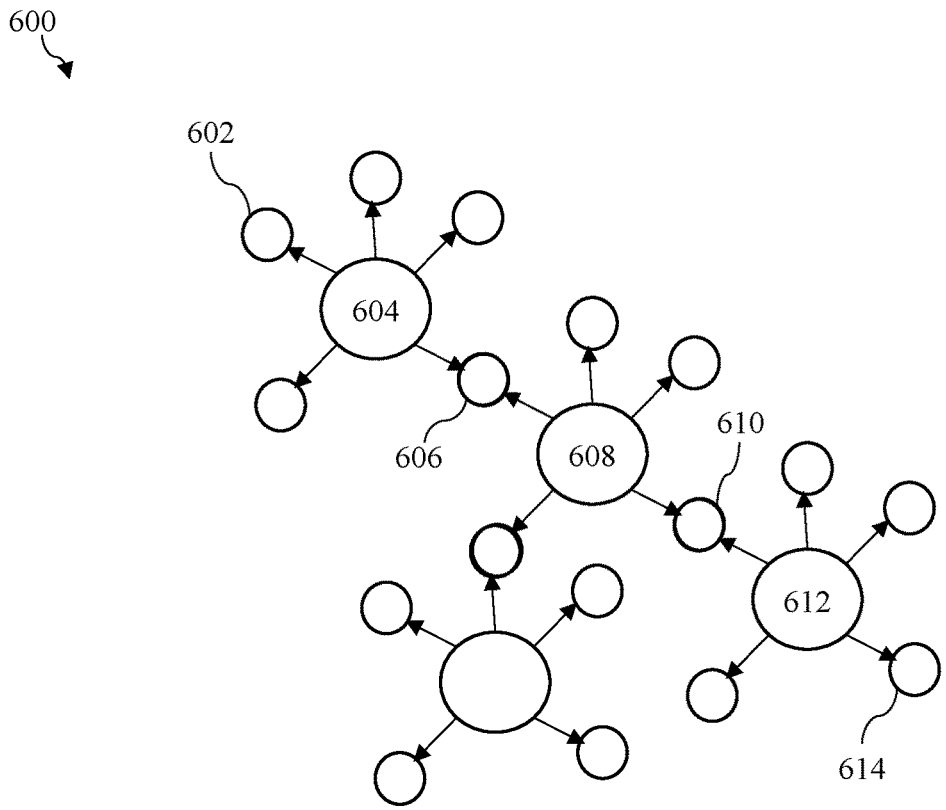
FIG. 5B illustrates an example fused knowledge graph used to answer a natural language query, in accordance to embodiments of the present disclosure.

To determine the answer to NLQ, the host device analyzes the nodes of the fused knowledge graph to identify the answer. Turning to FIG. 5B, shown is an example fused knowledge graph 600 generated from process 300 of FIG. 3, in accordance with embodiments of the present disclosure. In the illustrated embodiment, the fused knowledge graph 600 is made up of four individual knowledge graphs (KG-1, KG-2, KG-3, and KG-4) that were generated from individual documents in FIG. 4A. Using the fused knowledge graph 600, the host device may analyze each node and respective edge to come up with an answer to the received natural language query. In embodiments, the host device may perform a random walk through the nodes and edges of the fused knowledge graph to determine the answer to the NLQ.

For example, node 604, node 608, and node 612 represent previous individual knowledge graphs for "covered health conditions", "Insurance Product A", and "Health Insurance Company X" which include connecting node 602, node 606, node 610, and node 614. In order to determine the answer to the NLQ, the host device may traverse each of the nodes and edge until arriving at the correct answer across the fused knowledge graph 600. For example, node 602 may be an entity for "heart condition" that is connected to node 604 for covered health conditions that corresponds to Insurance Product A of node 608, which is a sub-product of Health-Insurance Company X of node 614. By traversing the nodes and edge of the fused knowledge graph 600 from node 614 to 602, the host device can determine the correct answer to the NLQ at step 510. For example, the host device will determine that Health Insurance Company X offers Insurance Product A that covers heart conditions.

The process 500 continues by outputting, in response to analyzing the fused knowledge graph, the answer to the natural language query. This is illustrated at step 515. Once determined, the host device 112 may output the answer to the natural language query to the remote device 102. Once the answer is outputted to the remote device, the process 500 may end. The fused knowledge graph 600 allows the host device 112 to answer cross-document questions that may not be answerable using traditional and/or individual knowledge graph frameworks.

Figure 6:
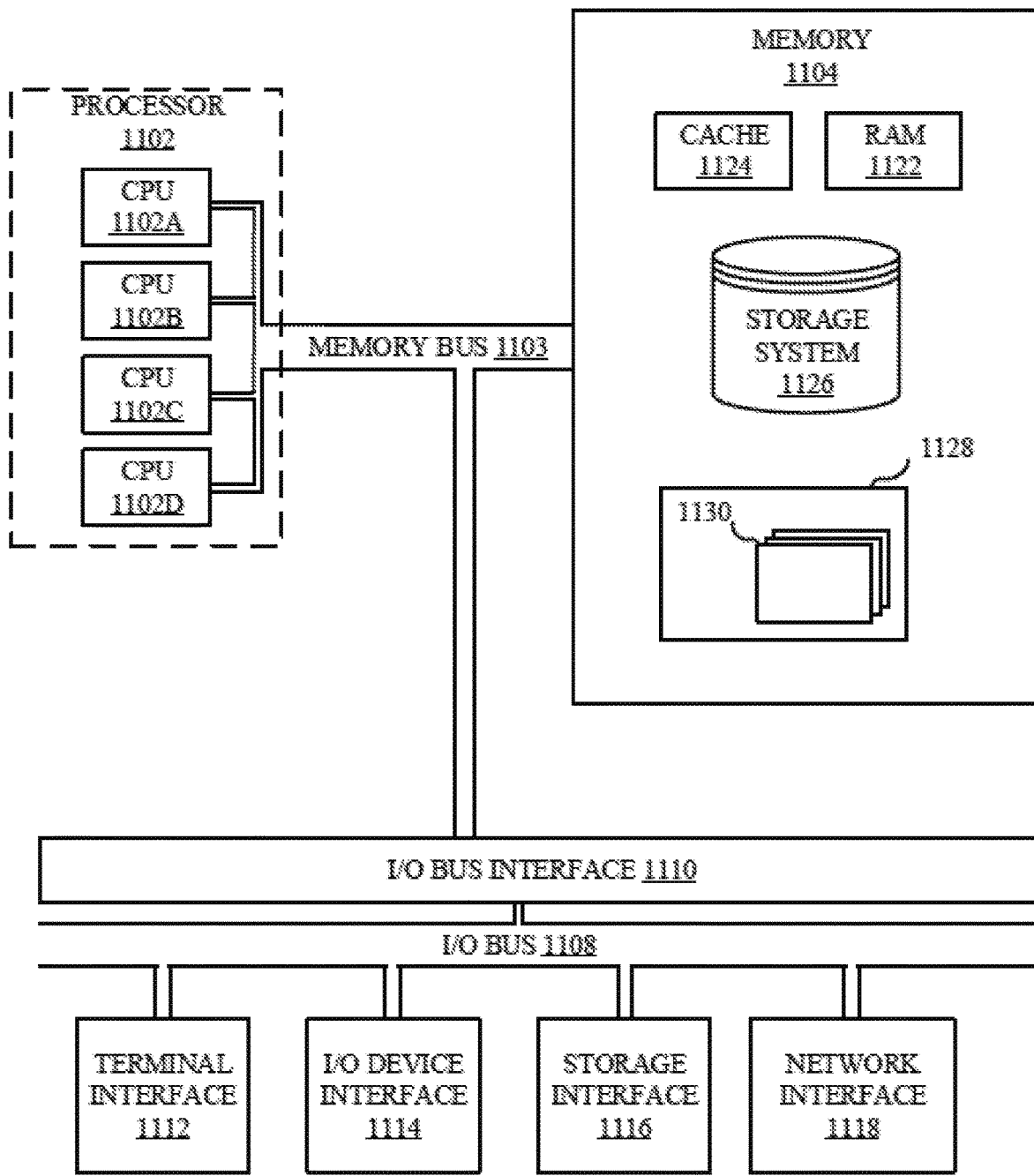
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 300 and 500).

System memory subsystem 1104 may include computer system readable media in the form of volatile memory, such as random-access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 1104 can include flash memory, e.g., a flash memory stick drive or a flash drive. Memory devices can be connected to memory bus 1103 by one or more data media interfaces. The memory subsystem 1104 may include at least one program product having a set (e.g., at least one) of program modules that are configured to carry out the functions of various embodiments.

Although the memory bus 1103 is shown in FIG. 6 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interfaces 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 1101. In some embodiments, however, individual components may have greater or lesser complexity than as represented in FIG. 6, components other than or in addition to those shown in FIG. 6 may be present, and the number, type, and configuration of such components may vary.

One or more programs/utilities 1128, each having at least one set of program modules 1130 may be stored in memory subsystem 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
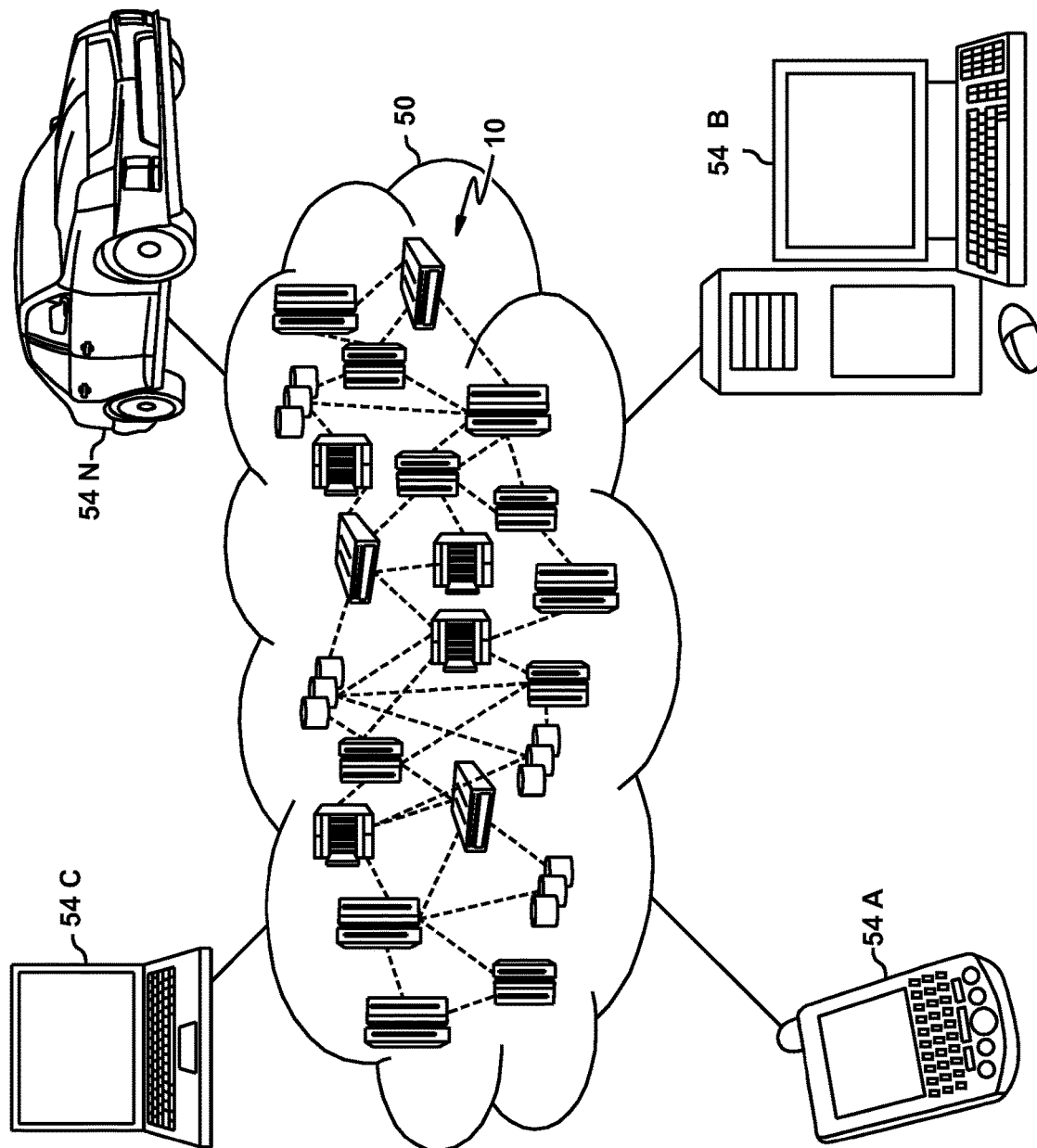
FIG. 7 depicts a cloud computing environment in accordance with embodiments of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
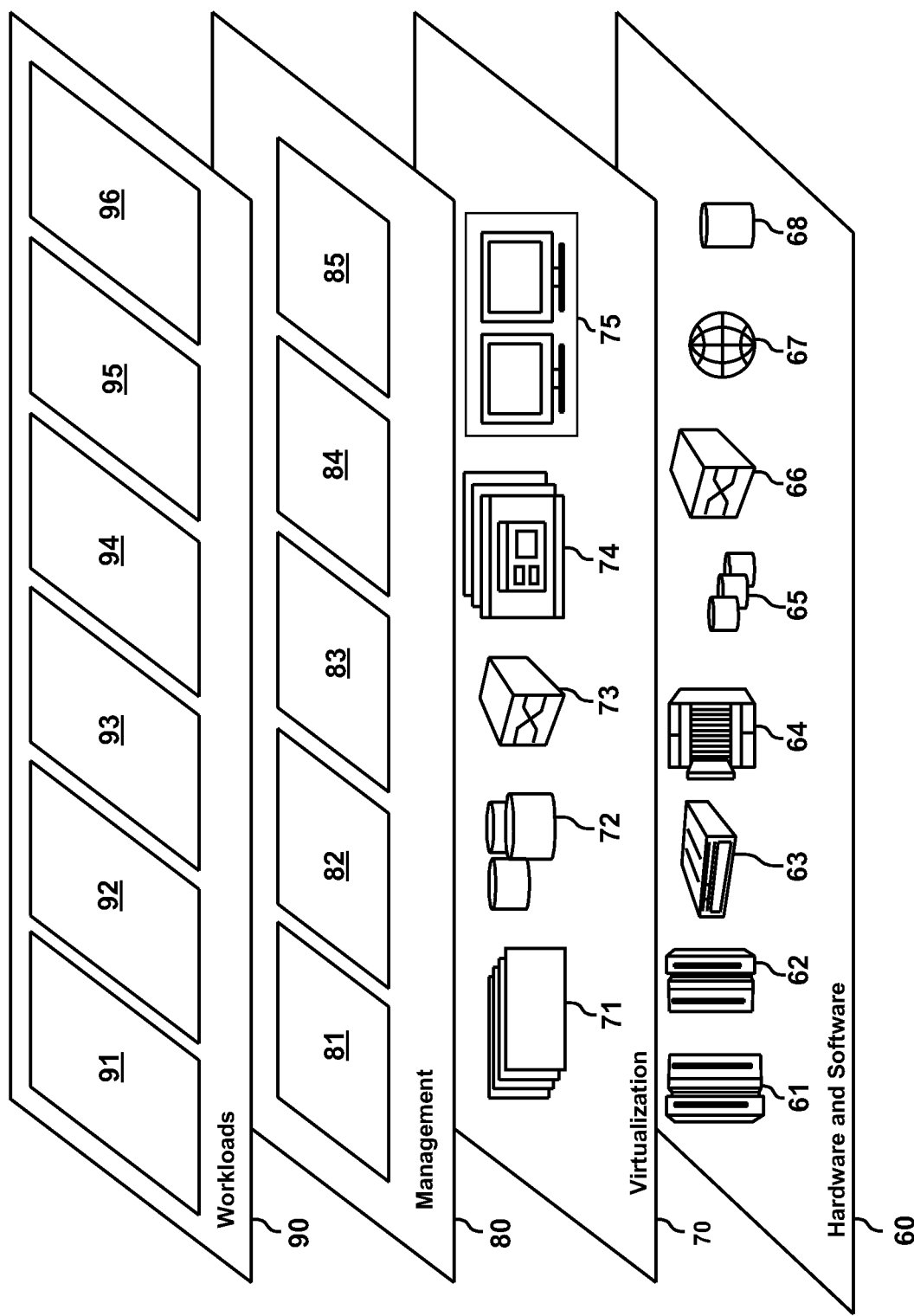
FIG. 8 depicts abstraction model layers in accordance with embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and knowledge graph fusion software 68 in relation to the knowledge graph fusion module 128 of host device 112 illustrated in FIG. 1.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
extracting contextual information from a plurality of documents;
generating, based on the extracted contextual information, a knowledge graph for each document of the plurality of documents;
analyzing each knowledge graph to determine if one or more entities of each knowledge graph are linked, wherein the analyzing comprises:
  determining a set of textual mentions related to each of the one or more entities of each knowledge graph; and
  mapping one or more textual mentions from the set of textual mentions related to each of the one or more entities to a same or a similar entity in a different knowledge graph based on a similarity score, wherein the similarity score is weighted based, in part, on one or more reliability characteristics of a source of each document of the plurality of documents;
fusing, in response to an entity in a first knowledge graph being linked to an entity in a second knowledge graph, the first knowledge graph with the second knowledge graph to create a fused knowledge graph;
receiving a first natural language query (NLQ) from a user regarding the one or more entities;
outputting, using the fused knowledge graph, an answer to the first NLQ;
receiving a second NLQ from the same user, wherein the second NLQ is substantially similar to the first NLQ;
determining, based on the second NLQ being substantially similar to the first NLQ, that an accuracy value of the answer to the first NLQ is low;
analyzing, using machine learning, the accuracy value of the answer to the first NLQ that was provided using the fused knowledge graph; and
modifying, using machine learning and based on the low accuracy value for the answer, algorithms for traversing the fused knowledge graph to obtain a higher accuracy value when providing a replacement answer.

2. The computer-implemented method of claim 1, wherein extracting the contextual information from the plurality of documents comprises:
performing named-entity recognition (NER) on unstructured text of each document of the plurality of documents;
identifying, in response to performing NER, the one or more entities from the unstructured text of each document; and
analyzing the one or more entities using a reading comprehension dataset.

3. The computer-implemented method of claim 2, wherein the reading comprehension dataset is a Stanford Question Answering Dataset (SQuAD).

4. The computer-implemented method of claim 1, wherein the contextual information comprises related entities, entity classes, and attributes of entities.

5. A system comprising:
a processor; and
a computer-readable storage medium communicatively coupled to the processor and storing program instructions which, when executed by the processor, cause the processor to perform a method comprising:
  extracting contextual information from a plurality of documents;
  generating, based on the extracted contextual information, a knowledge graph for each document of the plurality of documents;
  analyzing each knowledge graph to determine if one or more entities of each knowledge graph are linked, wherein the analyzing comprises:
    determining a set of textual mentions related to each of the one or more entities of each knowledge graph; and
    mapping one or more textual mentions from the set of textual mentions related to each of the one or more entities to a same or a similar entity in a different knowledge graph based on a similarity score, wherein the similarity score is weighted based, in part, on one or more reliability characteristics of a source of each document of the plurality of documents;
  fusing, in response to an entity in a first knowledge graph being linked to an entity in a second knowledge graph, the first knowledge graph with the second knowledge graph to create a fused knowledge graph;
  receiving a first natural language query (NLQ) from a user regarding the one or more entities;
  outputting, using the fused knowledge graph, an answer to the first NLQ;
  receiving a second NLQ from the same user, wherein the second NLQ is substantially similar to the first NLQ;
  determining, based on the second NLQ being substantially similar to the first NLQ, that an accuracy value of the answer to the first NLQ is low;
  analyzing, using machine learning, the accuracy value of the answer to the first NLQ that was provided using the fused knowledge graph; and
  modifying, using machine learning and based on the low accuracy value for the answer, algorithms for traversing the fused knowledge graph to obtain a higher accuracy value when providing a replacement answer.

6. The system of claim 5, wherein extracting the contextual information from the plurality of documents comprises:
performing named-entity recognition (NER) on unstructured text of each document of the plurality of documents;
identifying, in response to performing NER, the one or more entities from the unstructured text of each document; and
analyzing the one or more entities using a reading comprehension dataset.

7. The system of claim 6, wherein the reading comprehension dataset is a Stanford Question Answering Dataset (SQuAD).

8. A computer program product comprising a computer-readable storage medium having program instructions embodied therewith, the program instructions executable by a processor to cause the processor to perform a method comprising:
extracting contextual information from a plurality of documents;
generating, based on the extracted contextual information, a knowledge graph for each document of the plurality of documents;
analyzing each knowledge graph to determine if one or more entities of each knowledge graph are linked, wherein the analyzing comprises:

determining a set of textual mentions related to each of the one or more entities of each knowledge graph; and mapping one or more textual mentions from the set of textual mentions related to each of the one or more entities to a same or a similar entity in a different knowledge graph based on a similarity score, wherein the similarity score is weighted based, in part, on one or more reliability characteristics of a source of each document of the plurality of documents;

fusing, in response to an entity in a first knowledge graph being linked to an entity in a second knowledge graph, the first knowledge graph with the second knowledge graph to create a fused knowledge graph;

receiving a first natural language query (NLQ) from a user regarding the one or more entities;

outputting, using the fused knowledge graph, an answer to the first NLQ;

receiving a second NLQ from the same user, wherein the second NLQ is substantially similar to the first NLQ;

determining, based on the second NLQ being substantially similar to the first NLQ, that an accuracy value of the answer to the first NLQ is low;

analyzing, using machine learning, the accuracy value of the answer to the first NLQ that was provided using the fused knowledge graph; and modifying, using machine learning and based on the low accuracy value for the answer, algorithms for traversing the fused knowledge graph to obtain a higher accuracy value when providing a replacement answer.

9. The computer program product of claim 8, wherein extracting the contextual information from the plurality of documents comprises:

performing named-entity recognition (NER) on unstructured text of each document of the plurality of documents;

identifying, in response to performing NER, the one or more entities from the unstructured text of each document; and analyzing the one or more entities using a reading comprehension dataset.

10. The computer program product of claim 9, wherein the reading comprehension dataset is a Stanford Question Answering Dataset (SQuAD).

11. The computer-implemented method of claim 1, further comprising:

searching, automatically and continuously, for one or more additional documents that have not been analyzed;

extracting contextual information from a first additional document that has been identified as not being analyzed;

generating, based on the extracted contextual information from the first additional document, a third knowledge graph;

analyzing the third knowledge graph to determine if one or more entities of the third knowledge graph are linked to the one or more entities of the fused knowledge graph; and fusing, in response to an entity in the third knowledge graph being linked to an entity in the fused knowledge graph, the third knowledge graph with the fused knowledge graph to create a second fused knowledge graph.

12. The computer-implemented method of claim 1, wherein each step of the method is performed automatically using machine learning.

13. The computer-implemented method of claim 1, wherein the one or more reliability characteristics comprises at least an author or a version of each document of the plurality of documents.

* * * * *